(12) United States Patent
Liparoti

(10) Patent No.: US 8,534,520 B1
(45) Date of Patent: Sep. 17, 2013

(54) SHOPPING CART TRAY APPARATUS

(76) Inventor: Mario Liparoti, Mississauga (CA)

( * ) Notice: Subject to any disclaimer, the term of this patent is extended or adjusted under 35 U.S.C. 154(b) by 400 days.

(21) Appl. No.: 12/939,297

(22) Filed: Nov. 4, 2010

(51) Int. Cl.
*B60R 11/00* (2006.01)

(52) U.S. Cl.
USPC ............ 224/411; 224/282; 224/277; 224/926

(58) Field of Classification Search
USPC ................ 224/411, 926, 282, 277, 409, 420; 280/33.992; 108/50.16, 43
See application file for complete search history.

(56) References Cited

U.S. PATENT DOCUMENTS

| | | | |
|---|---|---|---|
| 3,251,543 A | 5/1966 | Bush et al. | |
| 3,964,134 A | 6/1976 | Newtson | |
| 4,450,994 A * | 5/1984 | Holland | 224/277 |
| 4,496,058 A * | 1/1985 | Harris et al. | 40/308 |
| 5,072,957 A | 12/1991 | Graebe, Jr. | |
| 5,106,156 A * | 4/1992 | Marquis | 297/153 |
| 5,460,102 A * | 10/1995 | Pasmanick | 108/43 |
| 5,494,306 A | 2/1996 | Adamson et al. | |
| 5,566,609 A * | 10/1996 | Kirschner | 108/42 |
| 5,617,982 A * | 4/1997 | Wilson | 224/411 |
| D383,284 S | 9/1997 | Lines | |
| D411,904 S | 7/1999 | Risholm et al. | |
| 6,299,119 B1 * | 10/2001 | Dunning | 248/346.03 |
| 6,453,588 B1 * | 9/2002 | Lykens | 40/308 |
| 7,219,822 B2 | 5/2007 | Chretien et al. | |
| 7,934,726 B1 * | 5/2011 | Johnson et al. | 280/33.992 |
| 7,975,623 B1 * | 7/2011 | Gassick et al. | 108/43 |
| 2004/0129852 A1 | 7/2004 | Giampavolo | |
| 2008/0237284 A1 | 10/2008 | Peota et al. | |
| 2010/0072715 A1 * | 3/2010 | Crum | 280/33.992 |
| 2010/0200629 A1 * | 8/2010 | Reynolds | 224/411 |
| 2011/0181007 A1 * | 7/2011 | Caruso et al. | 280/33.992 |

* cited by examiner

*Primary Examiner* — Justin Larson

(57) ABSTRACT

A shopping cart tray apparatus includes a plate that has a front edge, a back edge, a first lateral edge and a second lateral edge. A top side of the plate has a depression therein. A coupler is attached to a bottom of the plate. The coupler is configured to frictionally engage the handle of a shopping cart and support the plate on the handle.

10 Claims, 4 Drawing Sheets

SHOPPING CART TRAY APPARATUS

BACKGROUND OF THE DISCLOSURE

Field of the Disclosure

The disclosure relates to shopping cart mountable tray devices and more particularly pertains to a new shopping cart mountable tray device for supporting articles on a handle of a shopping cart.

SUMMARY OF THE DISCLOSURE

An embodiment of the disclosure meets the needs presented above by generally comprising a plate that has a front edge, a back edge, a first lateral edge and a second lateral edge. A top side of the plate has a depression therein. A coupler is attached to a bottom of the plate. The coupler is configured to frictionally engage the handle of a shopping cart and support the plate on the handle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
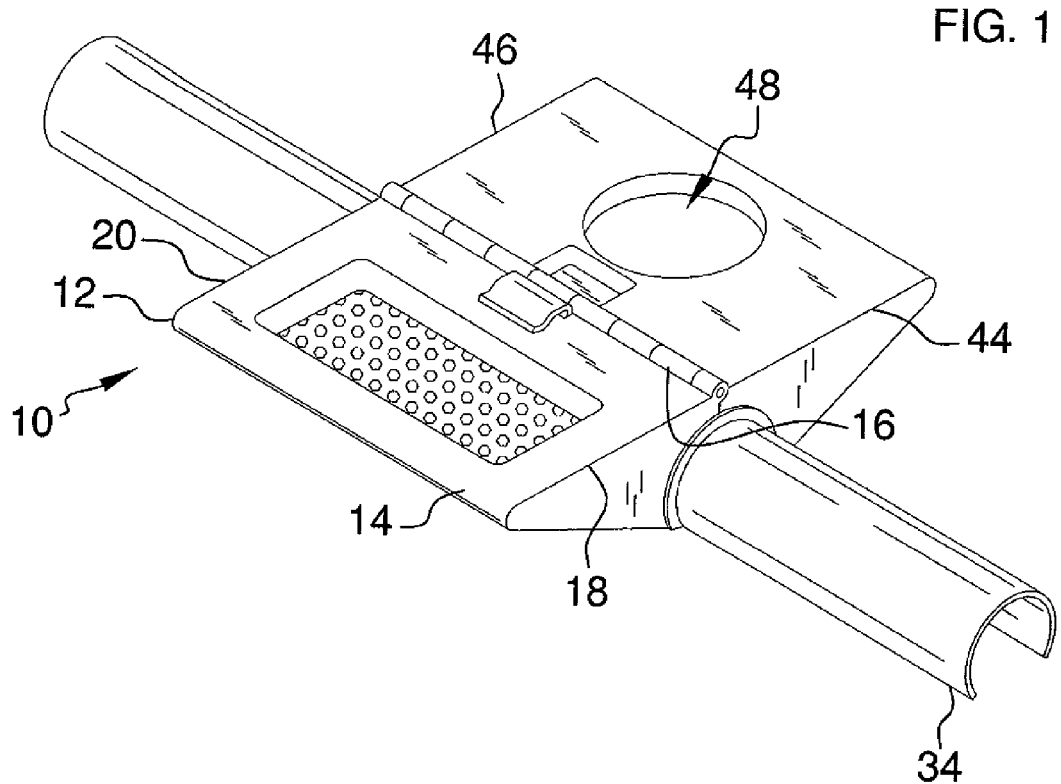
FIG. 1 is a top perspective view of a shopping cart tray apparatus according to an embodiment of the disclosure.
Figure 2:
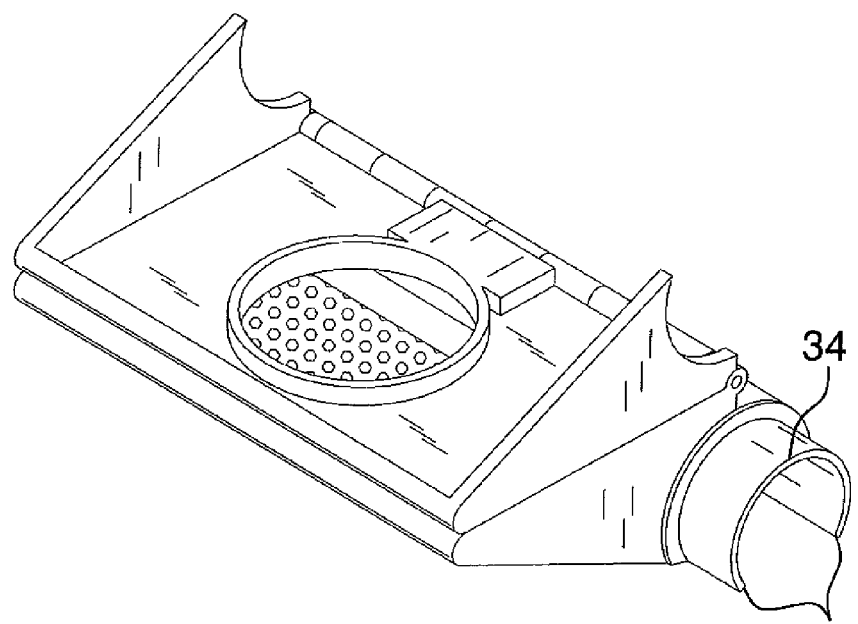
FIG. 2 is a top perspective view of an embodiment of the disclosure in a stored position.
Figure 3:
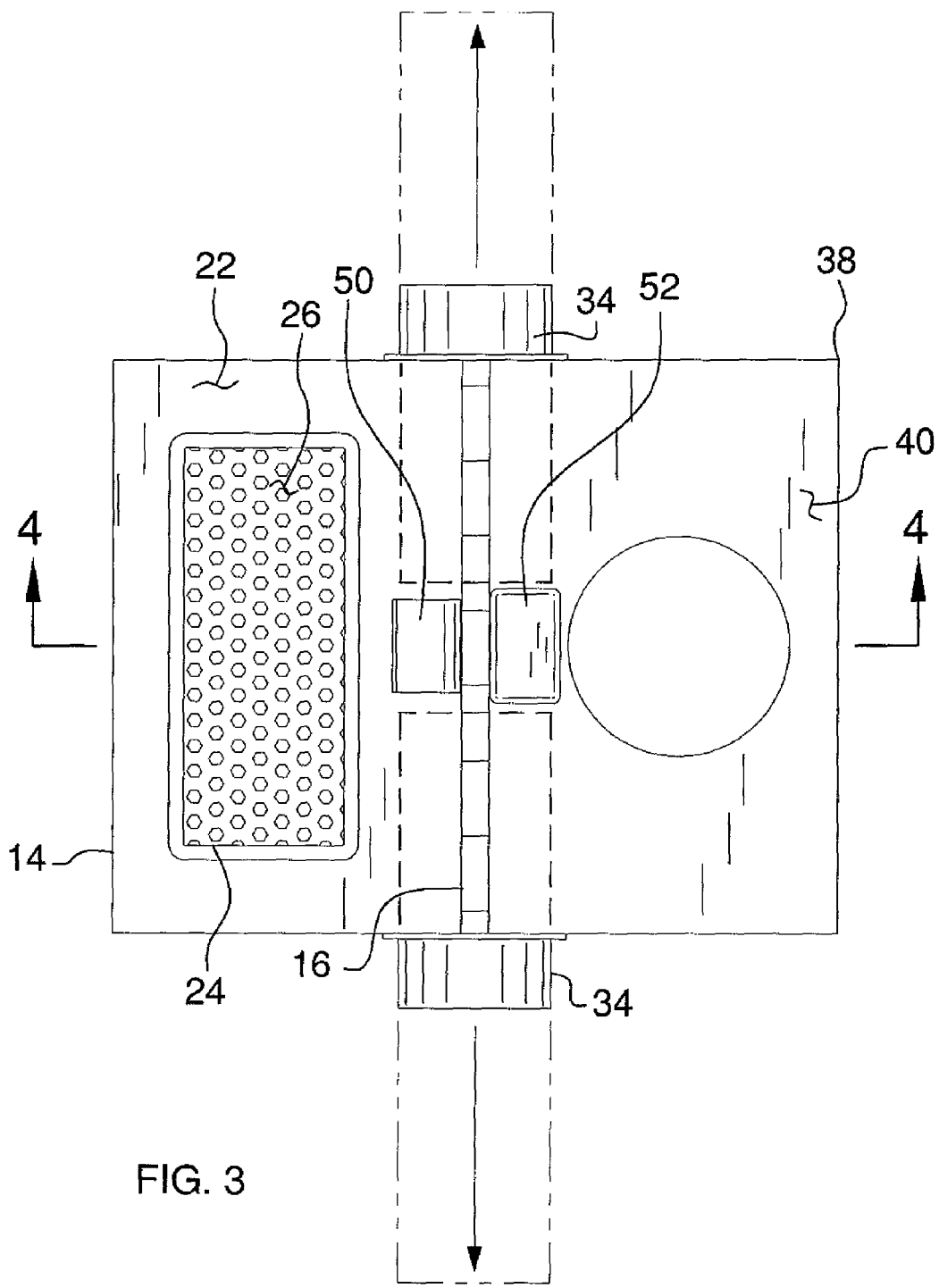
FIG. 3 is a top view of an embodiment of the disclosure.
Figure 4:
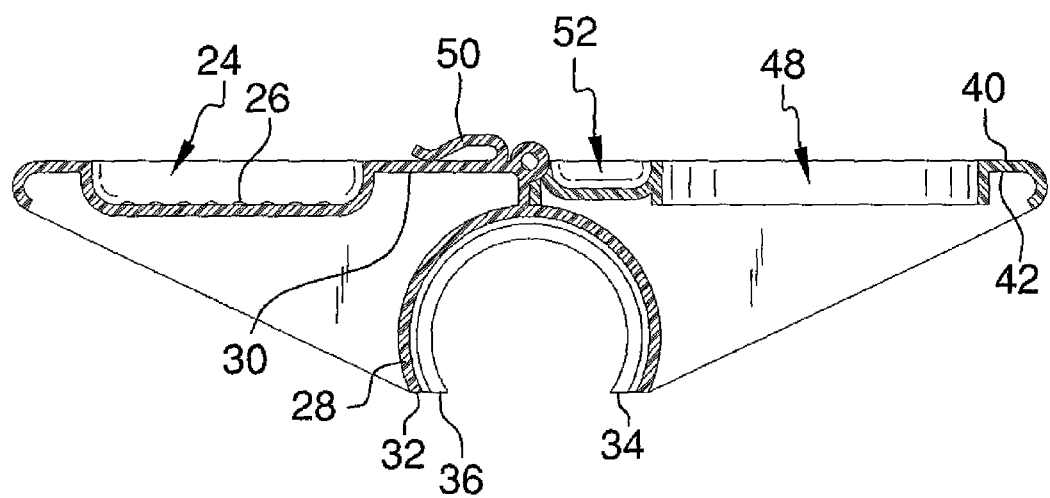
FIG. 4 is a cross-sectional view of an embodiment of the disclosure taken along line 4-4 of FIG. 3.

With reference now to the drawings, and in particular to FIGS. 1 through 5 thereof, a new shopping cart mountable tray device embodying the principles and concepts of an embodiment of the disclosure and generally designated by the reference numeral 10 will be described.

As best illustrated in FIGS. 1 through 5, the shopping cart tray apparatus 10 generally comprises a plate 12 that has a front edge 14, a back edge 16, a first lateral edge 18 and a second lateral edge 20. A top side 22 of the plate 12 has a depression 24 therein. A covering 26 is positioned in the depression 24. The covering 26 is comprised of a conventional non-slip material such as an elastomer.

A coupler 28 is attached to a bottom 30 of the plate 12. The coupler 28 is configured to frictionally engage a handle 72 of a shopping cart 70. The coupler 28 is elongated and comprises a cylinder that has a break 32 therein to receive the handle 72. The break 32 is positioned opposite of the plate 12. The coupler 28 is elongated and extends laterally away from each of the first 18 and second 20 lateral edges. This may be accomplished by the coupler 28 including a pair of cylindrical members 34, also including breaks 36, slidably coupled to the plate 12 so that they can be selectively extended outwardly from the first 18 and second 20 lateral sides.

A panel 38 is pivotally coupled to the back edge 16 of the plate 12. The panel 38 has an upper surface 40, a lower surface 42, first side edge 44, and a second side edge 46. The panel 38 is positionable in a deployed position extending away from and co-planar with the plate 12. The panel 38 is also positionable in a stored position wherein the upper surface 40 abuts the top side 22. The panel 38 has an aperture 48 therein extending into the upper surface 40 and outwardly of the lower surface 42. The aperture 48 is configured to receive and support a drinking container.

A clip 50 is attached to the plate 12 to facilitate article attachment to the plate 12. The article may include, for instance, coupons or a grocery list. The upper surface 40 has an indentation 52 therein to receive the clip when the panel 38 is in the stored position.

Figure 5:
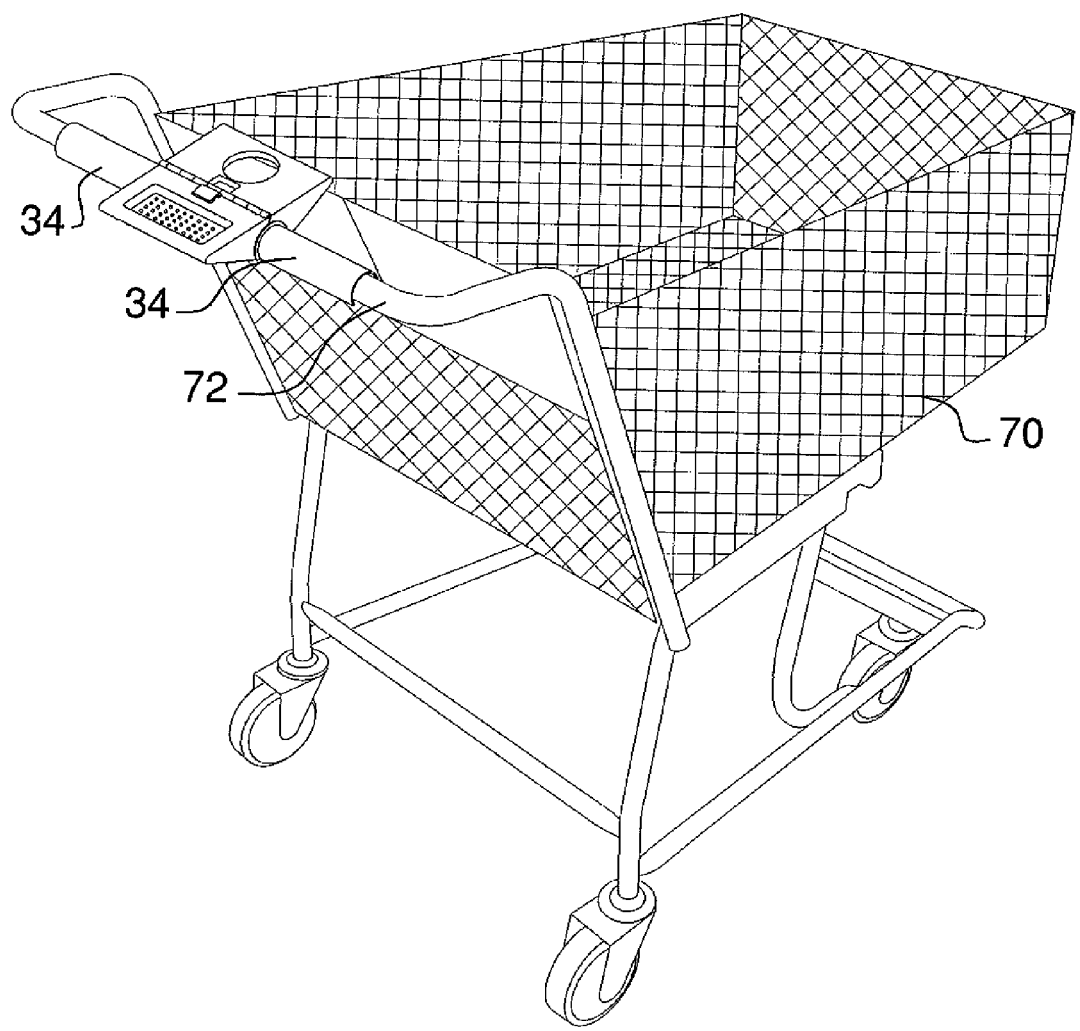
FIG. 5 is a perspective in-use view of an embodiment of the disclosure.

In use, the apparatus 10 is attached to a shopping cart 70 tubular handle 72 as shown in FIG. 5 with the coupler 28 which may or may not include the cylindrical members 34. The depression 24 in the plate 12 may be used for holding articles such as cellular phones. The panel 38 may be used for additional surface area and to hold drinking containers as needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A tray apparatus configured to engage a tubular shopping cart handle, said apparatus comprising:
    a plate having a front edge, a back edge, a first lateral edge and a second lateral edge, a top side of said plate having a depression therein; and
    a coupler being attached to a bottom of said plate, said coupler being configured to frictionally engage the handle and support said plate on the handle, said coupler being elongated and including a pair of cylindrical members, each of said cylindrical members having breaks therein to receive the handle, said cylindrical members being slidably coupled to said plate such that said cylindrical members are selectively extendable and retractable into and out of said first and second lateral edges.

2. The apparatus according to claim 1, wherein each of said breaks is positioned opposite of said plate.

3. The apparatus according to claim 1, wherein said coupler extends laterally away from each of said first and second lateral edges.

4. The apparatus according to claim 1, further including a covering being positioned in said depression, said covering being comprised of a non-slip material.

5. The apparatus according to claim 1, further including a clip being attached to said plate to facilitate article attachment to said plate.

6. The apparatus according to claim 5, said upper surface having an indentation therein to receive said clip when said panel is in said stored position.

7. The apparatus according to claim 1, further including a panel being pivotally coupled to said back edge of said plate, said panel having an upper surface, a lower surface, first side edge, and a second side edge, said panel being positionable in a deployed position extending away from and being co-planar with said plate and a stored position having said upper surface abutting said top side.

8. The apparatus according to claim 7, wherein said panel has an aperture therein extending into said upper surface and outwardly of said lower surface, said aperture being configured to receive and support a drinking container.

9. The apparatus according to claim 8, further including a clip being attached to said plate to facilitate article attachment to said plate.

10. A tray apparatus configured to engage a tubular shopping cart handle, said apparatus comprising:
- a plate having a front edge, a back edge, a first lateral edge and a second lateral edge, a top side of said plate having a depression therein;
- a coupler being attached to a bottom of said plate, said coupler being configured to frictionally engage the handle, said coupler being elongated and including a pair of cylindrical members, each of said cylindrical members having breaks therein to receive the handle, said cylindrical members being slidably coupled to said plate such that said cylindrical members are selectively extendable and retractable into and out of said first and second lateral edges, each of said breaks being positioned opposite of said plate, said coupler extending laterally away from each of said first and second lateral edges;
- a panel being pivotally coupled to said back edge of said plate, said panel having an upper surface, a lower surface, first side edge, and a second side edge, said panel being positionable in a deployed position extending away from and being co-planar with said plate and a stored position having said upper surface abutting said top side, said panel having an aperture therein extending into said upper surface and outwardly of said lower surface, said aperture being configured to receive and support a drinking container;
- a clip being attached to said plate to facilitate article attachment to said plate, said upper surface having an indentation therein to receive said clip when said panel is in said stored position; and
- a covering being positioned in said depression, said covering being comprised of a non-slip material.

\* \* \* \* \*